United States Patent
Kolhar et al.

(10) Patent No.: US 11,575,763 B2
(45) Date of Patent: Feb. 7, 2023

(54) SYSTEM AND METHOD FOR MANAGING CONFIGURATION DATA OF MONITORING AGENTS

(71) Applicant: VMWARE, INC., Palo Alto, CA (US)

(72) Inventors: Aditya Sushilendra Kolhar, Bangalore (IN); Rahav Vembuli, Bangalore (IN); Narendra Madanapalli, Bangalore (IN); Divith Shetty, Bangalore (IN); Padmini Sampige Thirumalachar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/885,313

(22) Filed: May 28, 2020

(65) Prior Publication Data
US 2021/0314424 A1    Oct. 7, 2021

(30) Foreign Application Priority Data

Apr. 3, 2020    (IN) .............................. 202041014841

(51) Int. Cl.
*H04L 67/00*    (2022.01)
*H04L 43/0876*    (2022.01)
*G06F 8/71*    (2018.01)

(52) U.S. Cl.
CPC ................ *H04L 67/34* (2013.01); *G06F 8/71* (2013.01); *H04L 43/0876* (2013.01)

(58) Field of Classification Search
CPC ........ G06F 11/1464; G06F 8/71; H04L 47/34; H04L 47/50; H04L 47/63; H04L 47/0428; H04L 63/0428; H04L 9/3263; H04L 67/34; H04L 43/0876
See application file for complete search history.

(56) References Cited

U.S. PATENT DOCUMENTS

| | | | | |
|---|---|---|---|---|
| 7,299,277 B1* | 11/2007 | Moran | ................ | H04L 41/5022 370/230 |
| 8,402,136 B1* | 3/2013 | Mayhead | ............... | G06Q 30/02 709/226 |
| 8,447,851 B1* | 5/2013 | Anderson | ........... | G06F 11/3082 709/223 |
| 2005/0138111 A1* | 6/2005 | Aton | ................... | G06F 11/3476 709/201 |
| 2005/0149847 A1* | 7/2005 | Chandler | ............ | H04L 41/0266 715/237 |

(Continued)

OTHER PUBLICATIONS

Leppanen et al., "Distributed Artifical Intelligence with Mulit-Agent Systems for MEC", Jul. 2019, IEEE Publishing.*

(Continued)

*Primary Examiner* — Todd L Barker

(57) ABSTRACT

In one example, a computer implemented method may include determining an application to be monitored in an endpoint, generating a marker with a unique identifier corresponding to the application running in the endpoint, bundling configuration data within the marker. The configuration data may include configuration settings of a monitoring agent installed on the endpoint to monitor the application. Further, the method may include appending the marker bundled with the configuration data to a configuration file of the monitoring agent and enabling the monitoring agent to monitor the application based on the configuration data in the configuration file.

18 Claims, 7 Drawing Sheets

```
                        TELEGRAF
252 ── ## START_MARKER_MYSQL_3306
     ┌ [[INPUTS.MYSQL]]
     │  SERVERS = ["USER:PASSWD@TCP(127.0.0.1:3306)/?TLS=FALSE"]
     │  PERF_EVENTS_STATEMENTS_DIGEST_TEXT_LIMIT = 120
     │  PERF_EVENTS_STATEMENTS_LIMIT      = 250
     │  PERF_EVENTS_STATEMENTS_TIME_LIMIT   = 86400
     │  TABLE_SCHEMA_DATABASES        = 0
200D │  GATHER_TABLE_SCHEMA         = FALSE
     │  GATHER_PROCESS_LIST         = TRUE
     │  GATHER_USER_STATISTICS       = TRUE
     │  GATHER_INFO_SCHEMA_AUTO_INC    = TRUE
     │  INTERVAL_SLOW    = "30M"
     │  TLS_CA = "/ETC/TELEGRAF/CA.PEM"
     │  TLS_CERT = "/ETC/TELEGRAF/CERT.PEM"
     └  TLS_KEY = "/ETC/TELEGRAF/KEY.PEM"
254 ── ## END_MARKER_MYSQL_3306
```

(56) References Cited

U.S. PATENT DOCUMENTS

| | | | | |
|---|---|---|---|---|
| 2006/0288014 | A1* | 12/2006 | Edwards | G06Q 10/06 |
| 2009/0138549 | A1* | 5/2009 | Huang | G06Q 10/06 |
| | | | | 709/203 |
| 2010/0293201 | A1* | 11/2010 | Thergaonkar | G06F 8/65 |
| | | | | 707/803 |
| 2011/0276951 | A1* | 11/2011 | Jain | G06F 11/3006 |
| | | | | 717/140 |
| 2012/0246297 | A1* | 9/2012 | Shanker | H04L 41/5064 |
| | | | | 709/224 |
| 2013/0036359 | A1* | 2/2013 | Campagnoni | G06F 11/3093 |
| | | | | 715/736 |
| 2014/0012949 | A1* | 1/2014 | Meyers | H04L 67/1095 |
| | | | | 709/217 |
| 2014/0237461 | A1* | 8/2014 | Kamity | G06F 8/656 |
| | | | | 717/169 |
| 2015/0304399 | A1* | 10/2015 | Kramer | H04L 41/0886 |
| | | | | 713/162 |
| 2016/0337329 | A1* | 11/2016 | Sood | H04L 63/205 |
| 2017/0139782 | A1* | 5/2017 | Chen | G06F 11/1438 |
| 2017/0185949 | A1* | 6/2017 | Mayhead | G06Q 10/087 |
| 2017/0346693 | A1* | 11/2017 | Dix | H04L 9/3265 |
| 2017/0373935 | A1* | 12/2017 | Subramanian | G06F 9/5072 |
| 2018/0285199 | A1* | 10/2018 | Mitkar | G06F 11/2097 |
| 2018/0367560 | A1* | 12/2018 | Mahaffey | H04L 12/4641 |
| 2019/0102405 | A1* | 4/2019 | Yang | H04L 67/02 |
| 2019/0339966 | A1* | 11/2019 | Moondhra | G06F 8/433 |
| 2020/0007405 | A1* | 1/2020 | Chitalia | H04L 41/14 |
| 2020/0252411 | A1* | 8/2020 | Inforzato | H04L 63/1425 |
| 2022/0311794 | A1* | 9/2022 | Maya | G06F 16/9024 |

OTHER PUBLICATIONS

Tseng et al, "Re-Think Monitoring Services frdo 5G Network: Challenges and Perspectives", Jun. 2019, IEEE Publlishing.* ip.com_npl, "Method and apparatus to automatically provide correct operating enviroment for software applications", IP.COM No. IPCOM000178191D, Jan. 19, 2009.*

* cited by examiner

```
COLLECTD
<!-START_MARKER_MYSQL_3306..>     ← 252
 <PLUGIN "MYSQL">
  <DATABASE "FOO">
     HOST "HOSTNAME"
     USER "USERNAME"
     PASSWORD "PASSWORD"
     PORT 3306
     MASTERSTATS TRUE
  </DATABASE>
  </DATABASE "BAR">
     HOST "LOCALHOST"
     SOCKET "/VAR/RUN/MYSQL/MYSQLD.SOCK"
     SLAVESTATS TRUE
     SLAVENOTIFICATIONS TRUE
   </DATABASE>
 </PLUGIN>
<!-END_MARKER_MYSQL_3306..>       ← 254
```

```
[[INPUTS.MYSQL]]
 SERVERS = ["USER:PASSWD@TCP(127.0.0.1:3306)/?TLS=FALSE"]
 PERF_EVENTS_STATEMENTS_DIGEST_TEXT_LIMIT = 120
 PERF_EVENTS_STATEMENTS_LIMIT      = 250
 PERF_EVENTS_STATEMENTS_TIME_LIMIT = 86400
 TABLE_SCHEMA_DATABASES     = 0
 GATHER_TABLE_SCHEMA        = FALSE
 GATHER_PROCESS_LIST        = TRUE
 GATHER_USER_STATISTICS     = TRUE
 GATHER_INFO_SCHEMA_AUTO_INC = TRUE
 INTERVAL_SLOW   = "30M"
 TLS_CA = "/ETC/TELEGRAF/CA.PEM"
 TLS_CERT = "/ETC/TELEGRAF/CERT.PEM"
 TLS_KEY = "/ETC/TELEGRAF/KEY.PEM"
```

```
TELEGRAF
START_MARKER_MYSQL_3306
[[INPUTS.MYSQL]]
  SERVERS = ["USER:PASSWD@TCP(127.0.0.1:3306)/?TLS=FALSE"]
  PERF_EVENTS_STATEMENTS_DIGEST_TEXT_LIMIT = 120
  PERF_EVENTS_STATEMENTS_LIMIT       = 250
  PERF_EVENTS_STATEMENTS_TIME_LIMIT  = 86400
  TABLE_SCHEMA_DATABASES       = 0
  GATHER_TABLE_SCHEMA    = FALSE
  GATHER_PROCESS_LIST    = TRUE
  GATHER_USER_STATISTICS      = TRUE
  GATHER_INFO_SCHEMA_AUTO_INC      = TRUE
  INTERVAL_SLOW      = "30M"
  TLS_CA = "/ETC/TELEGRAF/CA.PEM"
  TLS_CERT = "/ETC/TELEGRAF/CERT.PEM"
  TLS_KEY = "/ETC/TELEGRAF/KEY.PEM"
END_MARKER_MYSQL_3306
```

FIG. 2E

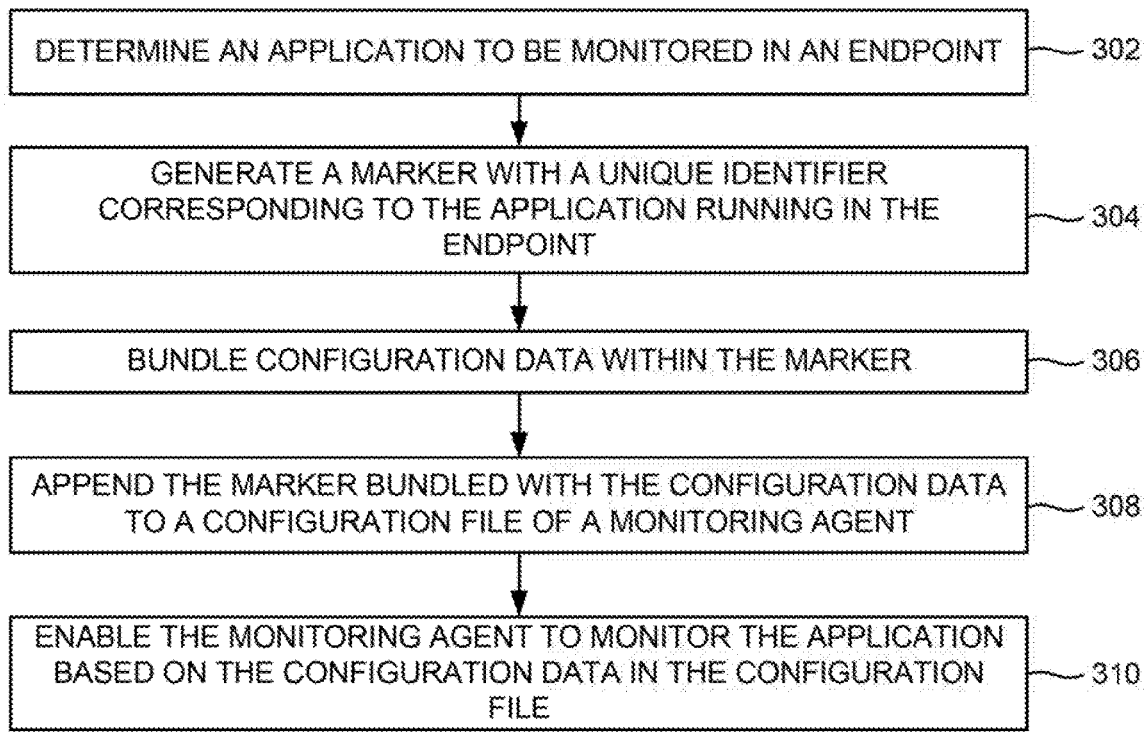

FIG. 3

SYSTEM AND METHOD FOR MANAGING CONFIGURATION DATA OF MONITORING AGENTS

RELATED APPLICATIONS

Benefit is claimed under 35 U.S.C. 119(a)-(d) to Foreign application Serial No. 202041014841 filed in India entitled "SYSTEM AND METHOD FOR MANAGING CONFIGURATION DATA OF MONITORING AGENTS", on Apr. 3, 2020, by VMware, Inc., which is herein incorporated in its entirety by reference for all purposes.

TECHNICAL FIELD

The present disclosure relates to computing environments, and more particularly to methods, techniques, and systems for managing configuration data of monitoring agents.

BACKGROUND

In computing environments, such as networked computing environments, cloud computing environments, virtualized environments, and the like, different applications and/or services may be executed on endpoints. Example endpoint may be a physical computer system, a workload, and the like. In an example virtualized environment, multiple physical computer systems (e.g., host computing systems) may execute different workloads such as virtual machines, containers, and the like running therein. Computer virtualization may be a technique that involves encapsulating a representation of a physical computing machine platform into a virtual machine that may be executed under the control of virtualization software running on hardware computing platforms. The hardware computing platforms may also be referred as the host computing systems or servers. A virtual machine can be a software-based abstraction of the physical computer system. Each virtual machine may be configured to execute an operating system (OS), referred to as a guest OS, and applications. A container may be a data computer node that runs on top of a host OS without the need for a hypervisor or separate OS. Further, the applications running on the endpoints may be monitored to provide performance metrics (e.g., application metrics, operating system metrics, and the like) in real time to detect and diagnose issues.

BRIEF DESCRIPTION OF THE DRAWINGS

FIG. 2A illustrates an example user interface to receive input data associated with an application to be monitored;

FIGS. 2B and 2D depict an example configuration data for monitoring MySQL using monitoring agents "Collectd" and "Telegraf" respectively;

FIGS. 2C and 2E illustrate the example configuration data of FIGS. 2B and 2D bundled within the corresponding markers;

FIG. 3 is an example flow diagram illustrating managing configuration data of a monitoring agent running in an endpoint using markers;

Figure 1:
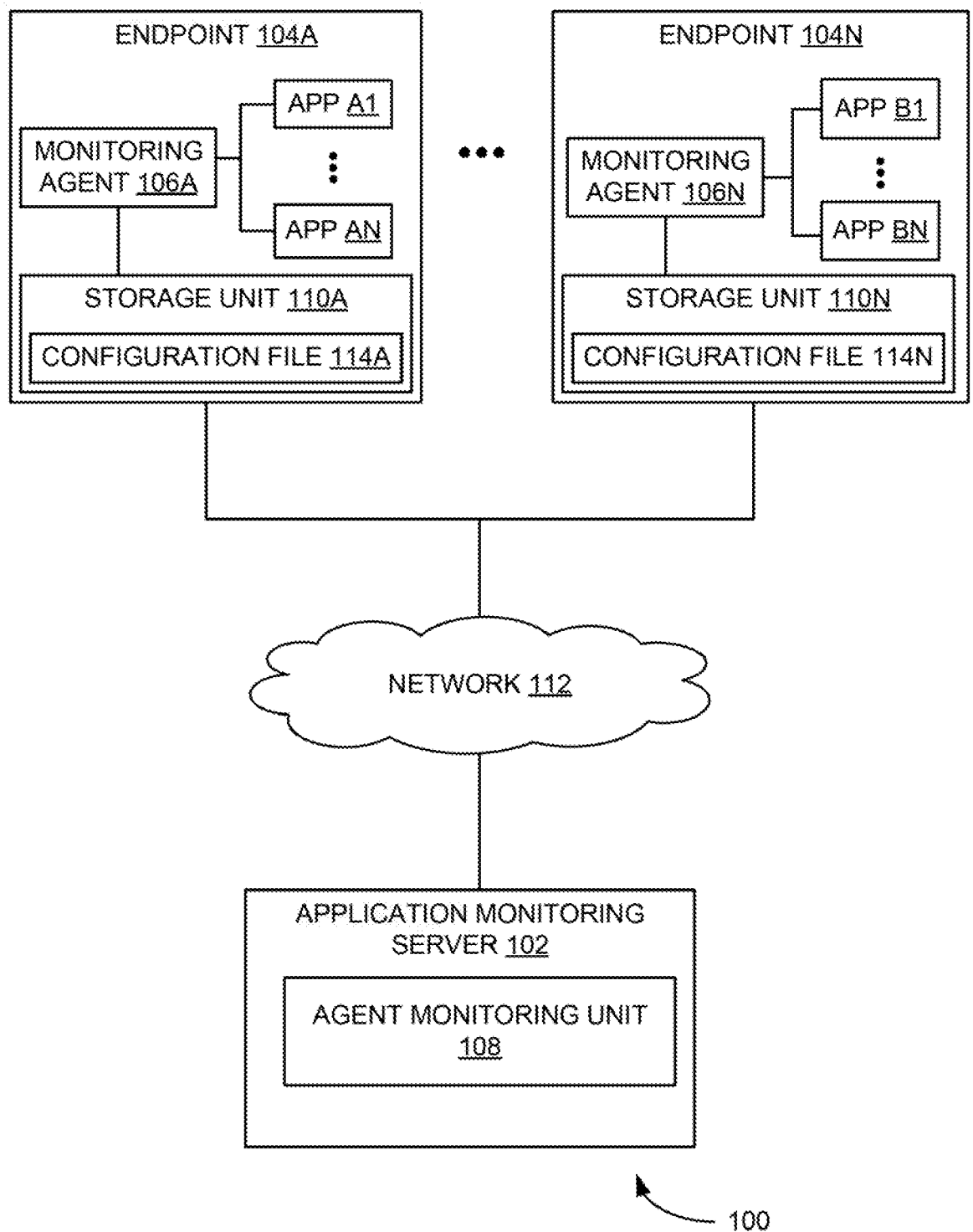
FIG. 1 is a block diagram of an example system, depicting an application monitoring server having an agent monitoring unit to manage configuration data lifecycle of monitoring agents running in respective endpoints.

The drawings described herein are for illustration purposes only and are not intended to limit the scope of the present subject matter in any way.

DETAILED DESCRIPTION

Examples described herein may provide an enhanced computer-based and/or network-based method, technique, and system to automatically manage configuration data of monitoring agents in a computing environment. Computing environment may be a physical computing environment (e.g., an on-premise enterprise computing environment or a physical data center) and/or virtual computing environment (e.g., a cloud computing environment, a virtualized environment, and the like).

The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. Example virtual computing environment may include different endpoints (e.g., physical computers, virtual machines, and/or containers). For example, the computing environment may include multiple physical computers executing different workloads such as virtual machines, containers, and the like running therein. Example endpoints may execute different types of applications.

Further, performance monitoring of such applications has become increasingly important because application monitoring may aid in troubleshooting (e.g., to rectify abnormalities or shortcomings, if any) the applications, provide better health of data centers, analyse the cost, capacity, and/or the like. The data centers can either be public (e.g., Amazon Web Services (AWS), Google Cloud Platform (GCP), and the like) or private (e.g., VMWare). Application monitoring may be referred to as application performance monitoring (APM) and/or application performance management (APM). Example performance monitoring tool or application or platform (e.g., VMware® vRealize Operations (vROps), Vmware Wavefront™, and the like) may receive performance metrics associated with applications from monitoring agents running in the endpoints. Further, the performance monitoring platform may display the performance metrics in a form of dashboards, for instance.

In some examples, the monitoring agents (e.g., Telegraf™, collectd, and the like) running in the endpoints may periodically run and collect the performance metrics of the applications running therein and send the performance metrics associated with applications to an application monitoring server. However, managing the content life cycle of such monitoring agents may become tedious without manual intervention. The term "content" may refer to a configuration for the monitoring agent to monitor the application.

The monitoring agents may be driven through a configuration file. For example, consider monitoring of a "MySQL"

application. A sample configuration with appropriate credentials can start monitoring of the "MySQL" application. However, consider a case where multiple applications are running along with multiple instances of each application. It may be tedious to manually configure each application across the data centers.

In some example monitoring software interested in application monitoring, the responsibility of deploying and managing the monitoring agent (e.g., monitoring agent management) may be given to end-users. End-users may have to manually configure the monitoring agent, and manually need to update the content. For example, a user workflow to manage applications may involve installing the monitoring agents on the endpoint, discover the applications on the machine, monitor the intended applications by adding the configuration for the applications on the installed monitoring agent, and collect performance metrics.

In some examples, tools such as Chef, Puppet and the like can be used to describe the configuration as code. Such tools may cater installation and configuration requirements of the selected monitoring agents and take care of making them service ready. However, it may be tedious for such tools to manage the monitoring agent when the monitoring agent goes rogue or when updates needs to be rolled up since there is no tight integration with the agent and the monitoring system.

Examples described herein may provide application monitoring server having an agent monitoring unit to manage configuration data lifecycle of monitoring agents. In one example, the agent monitoring unit may determine an application to be monitored. The application may be running in an endpoint. Further, the agent monitoring unit may generate a marker with a unique identifier corresponding to the application running in the endpoint. Furthermore, the agent monitoring unit may bundle configuration data within the marker. The configuration data may specify a configuration for the monitoring agent installed on the endpoint to monitor the application. Also, the agent monitoring unit may append the marker bundled with the configuration data to a configuration file of the monitoring agent and instruct the monitoring agent to monitor the application according to the configuration data in the configuration file.

Further, the agent monitoring unit may manage configuration data lifecycle (e.g., deleting the configuration data, updating the configuration data, or the like) of the monitoring agent using the marker. Thus, examples described herein may utilize markers combined with a unique way to identify an application/service with the application configuration so that the configuration can be bundled within the marker. Further, enabling and disabling monitoring of the application and updating the configuration data of the application can be done using the configuration data within the marker. Examples described herein may construct the marker in a unique way so that the marker may remain same for that instance of the application irrespective of a restart of the endpoint, restart of the application, or change in a port of the application.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described is included in at least that one example, but not necessarily in other examples.

System Overview and Examples of Operation

FIG. 1 is a block diagram of an example system 100, depicting an application monitoring server 102 having an agent monitoring unit 108 to manage configuration data lifecycle of monitoring agents 106A-106N running in respective endpoints 104A-104N. Example system 100 may include a computing environment such as a cloud computing environment (e.g., a virtualized cloud computing environment). For example, the cloud computing environment may be VMware vSphere®. The cloud computing environment may include one or more computing platforms that support the creation, deployment, and management of virtual machine-based cloud applications.

Example system 100 may include endpoints 104A-104N, each executing corresponding ones of applications (e.g., Apps A1-An, B1-Bn, and the like). Example endpoint 104 may be a host computing system, a virtual machine, a container, or the like. Example host computing system may be a physical computer. The physical computer may be a hardware-based device (e.g., a personal computer, a laptop, or the like) including an operating system (OS). The virtual machine may operate with its own guest OS on the physical computer using resources of the physical computer virtualized by virtualization software (e.g., a hypervisor, a virtual machine monitor, and the like). The container may be a data computer node that runs on top of host operating system without the need for the hypervisor or separate operating system.

As shown in FIG. 1, endpoints 104A-104N may execute multiple applications (e.g., Apps A1-An, B1-Bn, and the like). An application, also referred to as an application program or application software, may be a computer software package that performs a specific function directly for an end user or, in some cases, for another application. Examples of applications may include MySQL, Tomcat, Apache, word processors, database programs, web browsers, development tools, image editors, communication platforms, and the like.

Further, endpoints 104A-104N may include corresponding monitoring agents 106A and 106B to monitor applications running therein. For example, monitoring agents 106A and 106B may real-time monitor endpoints 104A and 104B, respectively, to collect the performance metrics associated with respective applications or operating systems running in corresponding endpoints 104A and 104B. Example monitoring agents 106A and 106B may include Telegraf agents, Collectd agents, and the like. Each monitoring agent 106 may include input and output plugins. Input plugins may be responsible for collecting the performance metrics from underlying applications running on endpoints 104A-104N. For example, the performance metrics may include performance metric values associated with at least one of central processing unit (CPU), memory, storage, graphics, network traffic, or the like.

Furthermore, system 100 may include application monitoring server 102 communicatively connected to endpoints 104A-104N via a network 112. Example network 112 can be a managed Internet protocol (IP) network administered by a service provider. For example, network 112 may be implemented using wireless protocols and technologies, such as WiFi, WiMax, and the like. In other examples, network 112 can also be a packet-switched network such as a local area network, wide area network, metropolitan area network, Internet network, or other similar type of network environment. In yet other examples, network 112 may be a fixed wireless network, a wireless local area network (LAN), a wireless wide area network (WAN), a personal area network (PAN), a virtual private network (VPN), intranet or other suitable network system and includes equipment for receiving and transmitting signals.

In one example, application monitoring server 102 may include agent monitoring unit 108. During operation, agent monitoring unit 108 may determine an application (e.g., A1) to be monitored. The application A1 may be running in endpoint 104A. In one example, application A1 may be determined to be monitored in response to receiving a request to monitor application A1. Further, agent monitoring unit 108 may generate a marker with a unique identifier corresponding to application A1 running in endpoint 104A. In one example, the unique identifier may include any combination of application name, port number, and service identifier associated with the application to uniquely identify application A1.

Furthermore, agent monitoring unit 108 may bundle configuration data within the marker. The configuration data may specify a configuration for monitoring agent 106A installed on endpoint 104A to monitor application A1. Also, agent monitoring unit 108 may append the marker bundled with the configuration data to a configuration file 114A of monitoring agent 106A. As shown in FIG. 1, endpoints 104A-104N may include storage units 110A-110N, respectively. Example storage unit 110 may include EEPROM, a hard disk drive, or other nonvolatile memory. Further, configuration files 114A-114N may be stored in storage units 110A-110N, respectively. A configuration file may be a file in which configuration data related to monitoring of the applications by monitoring agents is stored. Agent monitoring unit 108 may append the marker bundled with the configuration data to configuration file 114A by sending configuration data bundled within the marker to monitoring agent 106A, the configuration data may configure monitoring agent to implement a monitoring policy.

In one example, agent monitoring unit 108 may bundle the configuration data within the marker by inserting the configuration data between a start marker and an end marker. In this example, the configuration data may follow the start marker and the end marker may follow the configuration data. The start marker and the end marker may distinguish the configuration data of the application from configuration data of other applications that are being monitored by monitoring agent 106A.

Then, agent monitoring unit 108 may instruct monitoring agent 106A to monitor application A1 according to the configuration data in configuration file 114A. Monitoring agent 106A may monitor application A1 by accessing configuration file 114A at a predefined location in storage unit 110A upon initiating the monitoring of application A1. Monitoring agent 106A may transmit performance metrics associated with application A1 to application monitoring server 102 via network 112.

For example, agent monitoring unit 108 may bundle the configuration data within the marker either during installation of monitoring agent 106A in endpoint 104A or during operation of monitoring agent 106A to monitor application A1. In one example, during installation of monitoring agent 106A in endpoint 104A, agent monitoring unit 108 may receive, via a user interface, input data associated with application A1 to be monitored from a user and generate the configuration data using the received input data. Then, agent monitoring unit 108 may bundle the generated configuration data within the marker.

In another example, when monitoring agent 104A is already installed and configured to monitor application A1, then agent monitoring unit 108 may:

decrypt configuration file 114A of monitoring agent 106A running in endpoint 104A upon receiving a request to monitor application A1, configuration file 114A may include the configuration data of monitoring agent 106A to monitor application A1, bundle the configuration data corresponding to application A1 within the marker, append the marker bundled with the configuration data to decrypted configuration file 114A, and encrypt configuration file 114A including the marker bundled with the configuration data.

Further, agent monitoring unit 108 may disable monitoring of application A1 by deleting the configuration data within the marker. In this example, agent monitoring unit 108 may disable the monitoring of application A1 by determining the unique identifier for application A1 running in endpoint 104A, recreating a reference marker using the unique identifier to identify application 104A, matching the reference marker with the marker stored in configuration file 114A, and deleting the configuration data within the marker that matches the reference marker. Thus, agent monitoring unit 108 may provide a start instruction to monitoring agent 106A to enable monitoring of application A1, a stop instruction to monitoring agent 106A to disable monitoring of application A1, or the like.

Furthermore, agent monitoring unit 108 may receive a checksum of the configuration data of application A1 being monitored from endpoint 104A via network 112 and compare the received checksum to a versioning file stored in application monitoring server 102. The versioning file may include checksums of configuration data of multiple applications obtained from static content hosted in application monitoring server 102. The checksums may be dynamically updated upon performing changes/updates to the static content on application monitoring server 102. Further, agent monitoring unit 108 may determine an update to the configuration data of the application in endpoint 104A based on the comparison. In addition, agent monitoring unit 108 may send the update to endpoint 104A via network 112. In one example, agent monitoring unit 108 may notify the update via a user interface of endpoint 104A.

In some examples, system 100 may include an application remote collector to collect the performance metrics from endpoints 104A-104N via a network. Further, the application remote collector may transmit the performance metrics to application monitoring server 102 via a network 112. In other examples, the application remote collector may be implemented in a computing device that is connected external to application monitoring server 102 or may be implemented as a part of application monitoring server 102.

In some examples, the functionalities described in FIG. 1, in relation to instructions to implement functions of agent monitoring unit 108 and any additional instructions described herein in relation to the storage medium, may be implemented as engines or modules comprising any combination of hardware and programming to implement the functionalities of the modules or engines described herein. The functions of agent monitoring unit 108 may also be implemented by a respective processor. In examples described herein, the processor may include, for example, one processor or multiple processors included in a single device or distributed across multiple devices. In some examples, application monitoring server 102 can be a part of management software (e.g., vROps and Wavefront that are offered by VMware®).

Figures 2A, 2B:
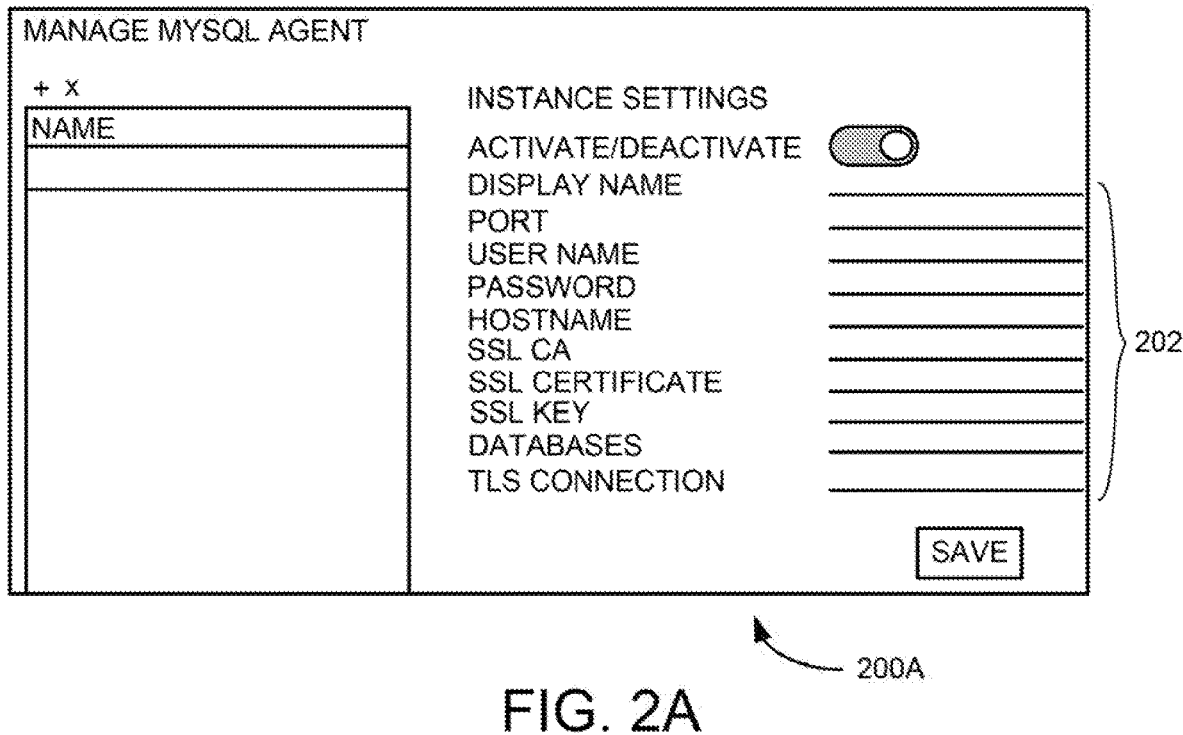

FIG. 2A illustrates an example user interface 200A to receive input data 202 associated with application A1 (e.g., as shown in FIG. 1) to be monitored. For example, during installation, application monitoring server 102 (e.g., as shown in FIG. 1) may install monitoring agent 106A (e.g., as shown in FIG. 1) on monitored endpoint 104A (e.g., as shown in FIG. 1). The installed monitoring agent 106A may discover the services (e.g., applications) running on endpoint 104A. Once the services are discovered, a user may be interested in monitoring the services. For instance, in order to monitor MySQL, specific information (e.g., input data 202) may be obtained from the user as shown in the user interface 200A. Example input data 202 obtained from the user may include display name, port data, user name, password, host name, security information (e.g., Secure Sockets Layer (SSL) certificate), and so on.

Each application may require different input data from the user which can be specified through the configuration data. Upon receiving input data 202, the configuration for monitoring agent 106A may be saved in endpoint 104A. FIGS. 2B and 2D depict an example configuration data 200B and 200D for monitoring MySQL using monitoring agents "Collectd" and "Telegraf" respectively.

Further, agent monitoring unit 104A may bundle the configuration data inside the markers with markers being commented. In one example, each marker may be constructed by using a combination of application name, port number, or service identifier which can uniquely identify the service along with a literal string. This marker is added at the beginning and end of the configuration data as shown in FIGS. 2C and 2E.

FIGS. 2C and 2E illustrate the example configuration data of FIGS. 2B and 2D bundled within the corresponding markers. In the example shown in FIG. 2C, configuration data 200B of FIG. 2B may be bundled between a start marker 252 (e.g., Begin marker start_marker_3306) and an end marker 254 (e.g., End marker—end_marker_3306). In the example shown in FIG. 2E, configuration data 200D of FIG. 2D may be bundled between a start marker 252 (e.g., Begin marker—start_marker_3306) and an end marker 254 (e.g., End marker end_marker_3306). The markers bundled with the configuration data may distinguish one application from another application and one instance of the application from another.

During starting the monitoring of application A1, agent monitoring unit 108 may add the configuration data bundled within start marker 252 and end marker 254 to configuration file 114A. While disabling the monitoring of application A1, agent monitoring unit 108 may determine the unique identifier for application A1 along with a name of the application, reconstruct the marker, and delete the configuration data between start marker 252 and end marker 254 that matches the reconstructed marker. When there is update in the configuration data at application monitoring server side, the configuration data may need to be pushed to endpoint 104A. In this case, agent monitoring unit 108 may determine if an update to the configuration data needs to be pushed to endpoint 104A and send the update to endpoint 104A using the marker. Thus, the configuration data can be managed without any manual intervention.

In some examples, the configuration data bundled within the marker may be encrypted at one place and the whole configuration file can be deleted after starting monitoring agent 106A to prevent any security threat with respect to password being stored in a plain file.

Example Processes

FIG. 3 is an example flow diagram 300 illustrating managing configuration data of a monitoring agent running in an endpoint using markers. It should be understood that the process depicted in FIG. 3 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 302, an application to be monitored in an endpoint may be determined. In one example, the application to be monitored may be determined in response to receiving a request to monitor the application. At 304, a marker with a unique identifier may be generated corresponding to the application running in the endpoint. The unique identifier may include any combination of application name, port number, and service identifier associated with the application.

At 306, configuration data may be bundled within the marker. The configuration data may specify a configuration for a monitoring agent installed on the endpoint to monitor the application. In one example, bundling the configuration data within the marker may include inserting the configuration data between a start marker and an end marker.

At 308, the marker bundled with the configuration data may be appended to a configuration file of the monitoring agent. In one example, during deployment of the monitoring agent on the endpoint, input data associated with the application to be monitored may be received from a user and then the configuration data may be generated using the received input data.

In another example, when the monitoring agent is already installed and monitoring the application, the configuration file of the monitoring agent running in the endpoint may be decrypted upon receiving a request to monitor the application. The configuration file may include the configuration data of the monitoring agent to monitor the application. Further, the marker bundled with the configuration data may be appended to the decrypted configuration file. Then, the configuration file including the marker bundled with the configuration data may be encrypted.

In one example, configuration data of the monitoring agent running in an endpoint may be managed using markers. For example, managing the configuration data may include enabling the monitoring of the application, disabling the monitoring of the application, and/or updating the configuration data in the configuration file.

At 310, the monitoring agent may be enabled to monitor the application based on the configuration data in the configuration file. Further, at least a portion of the configuration file including the configuration data bundled within the marker may be encrypted upon executing the monitoring agent.

In some examples, monitoring of the application may be disabled by deleting the configuration data within the marker. In this example, the monitoring of the application may be disabled by:
- determining the unique identifier for the application running in the endpoint,
- recreating a reference marker using the unique identifier to identify the application,
- matching the reference marker with the marker stored in the configuration file, and
- deleting the configuration data within the marker that matches the reference marker to disable monitoring of the application.

In other examples, the configuration data in the configuration file may be updated by:
- receiving a checksum of the configuration data of the application being monitored from the endpoint via a network,
- comparing the received checksum to a versioning file stored in an application monitoring server. The versioning file may include checksums of configuration data of multiple applications obtained from static content hosted in the application monitoring server. Further, the checksums may be dynamically updated upon performing updates to the static content on the application monitoring server,
- determining an update to the configuration data of the application in the endpoint based on the comparison,
- sending the update to the endpoint via the network; and
- updating the configuration data within the marker in response to a user selection of the update.

Figure 4:
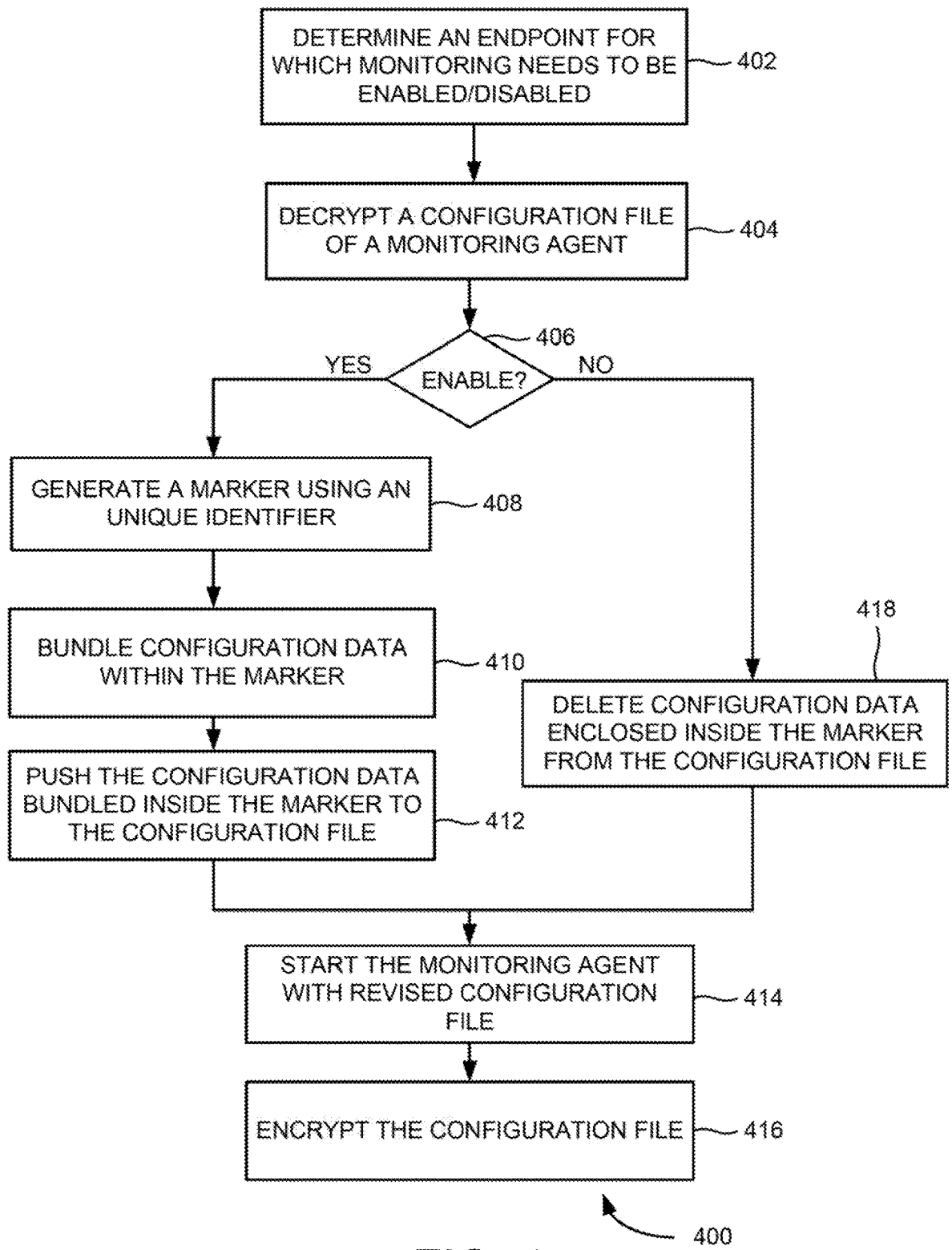
FIG. 4 is another example flow diagram illustrating managing configuration data of a monitoring agent running in an endpoint using markers.

FIG. 4 is another example flow diagram 400 illustrating managing configuration data of a monitoring agent running in an endpoint using markers. At 402, an endpoint for which monitoring needs to be enabled/disabled may be determined, for instance, in response to receiving a request. At 404, a configuration file of the monitoring agent running in the endpoint may be decrypted. At 406, a check is made to determine whether the request is for enabling or disabling monitoring of an application running in the endpoint. If the request is for enabling monitoring of the application, at 408, a marker may be generated using a unique identifier. At 410, the configuration data may be bundled within the marker. The configuration data may specify a configuration for the monitoring agent to monitor the application.

At 412, the configuration data bundled inside the marker may be pushed to the configuration file. At 414, the monitoring agent may be started with modified configuration file (i.e., including the configuration data bundled inside the marker). If the request is for disabling monitoring of the application, at 418, configuration data enclosed inside the marker may be deleted from the configuration file. Then, the process goes to 414, at which, the monitoring agent may be started with modified configuration file (i.e., with the deleted configuration data bundled inside the marker). At 416, the modified configuration file may be encrypted.

Figure 5:
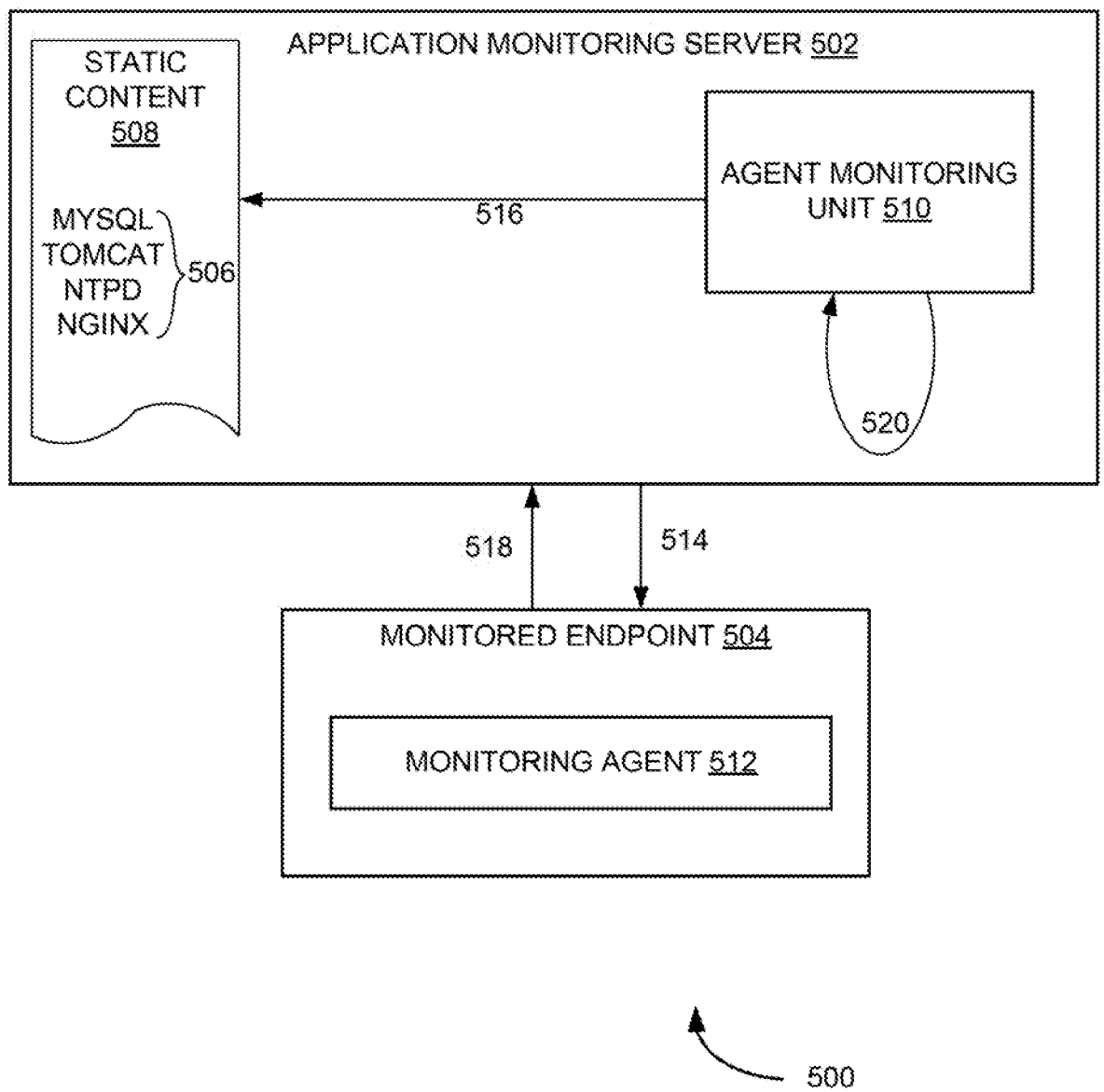
FIG. 5 is schematic representation of a system, depicting an example process to update configuration data within a marker.

FIG. 5 is schematic representation of a system, depicting an example process to update the configuration data within the marker. System 500 may include an application monitoring server 502 and a monitored endpoint 504 communicatively coupled to application monitoring server 502. Also, application monitoring server 502 may include static content 508 hosted therein and an agent monitoring unit 510. Monitored endpoint 504 may include a monitoring agent 512.

For example, when there is update in the configuration data at application monitoring server 502, the configuration data may need to be pushed to monitored endpoint 504. To determine to which endpoint the content needs to be pushed, application monitoring server 502 may need to keep information of the version of each application running in endpoints which involves significant amount of bookkeeping. Also, consider a scenario where configuration data of certain applications are updated and not all applications. In this case, configuration data of only the updated applications may need to be pushed to the endpoints. This may be a tedious job considering the possibility of maintaining version for each and every application separately and needs to change the version if there is any update in the configuration data.

Examples described herein may provide an update mechanism such that application monitoring server 502 may not perform bookkeeping of the endpoint content. In this example, when monitoring is enabled at endpoint 504, a checksum of the configuration data of the application may be stored in endpoint 504. The checksum of the configuration data may be determined by the checksum of the configuration file. In this case, any changes in the configuration file may generate a new checksum. The checksum of the configuration data may be periodically sent to application monitoring server 502 along with the performance metrics by monitoring agent 512. Further, application monitoring server 502 may include a versioning file which has the latest checksums of the configuration data of multiple applications (e.g., 506) obtained from static content 508 hosted in application monitoring server 502. When the configuration data of the application is changed/updated at application monitoring server 502, correspondingly an associated checksum may also be changed and updated in the versioning file. The checksum sent by endpoint 504 may be compared with the versioning file in application monitoring server 502 to determine whether any update needs to be pushed to endpoint 504.

As shown in FIG. 5, at 514, monitoring agent 512 may be installed and the application may be monitored by monitoring agent 512. At 516, a checksum of the configuration data of multiple applications (e.g., 506) may be obtained from static content 508 hosted in application monitoring server 502. At 518, a checksum of the configuration data of the application being monitored may be periodically received from endpoint 504. At 520, the checksum of the configuration data of the application received from monitored endpoint 504 may be compared to checksums of the configuration data of multiple applications (e.g., 506) obtained from static content 508 to determine an update to the configuration data. Further, agent monitoring unit 510 may push the update to endpoint 504.

Figure 6:
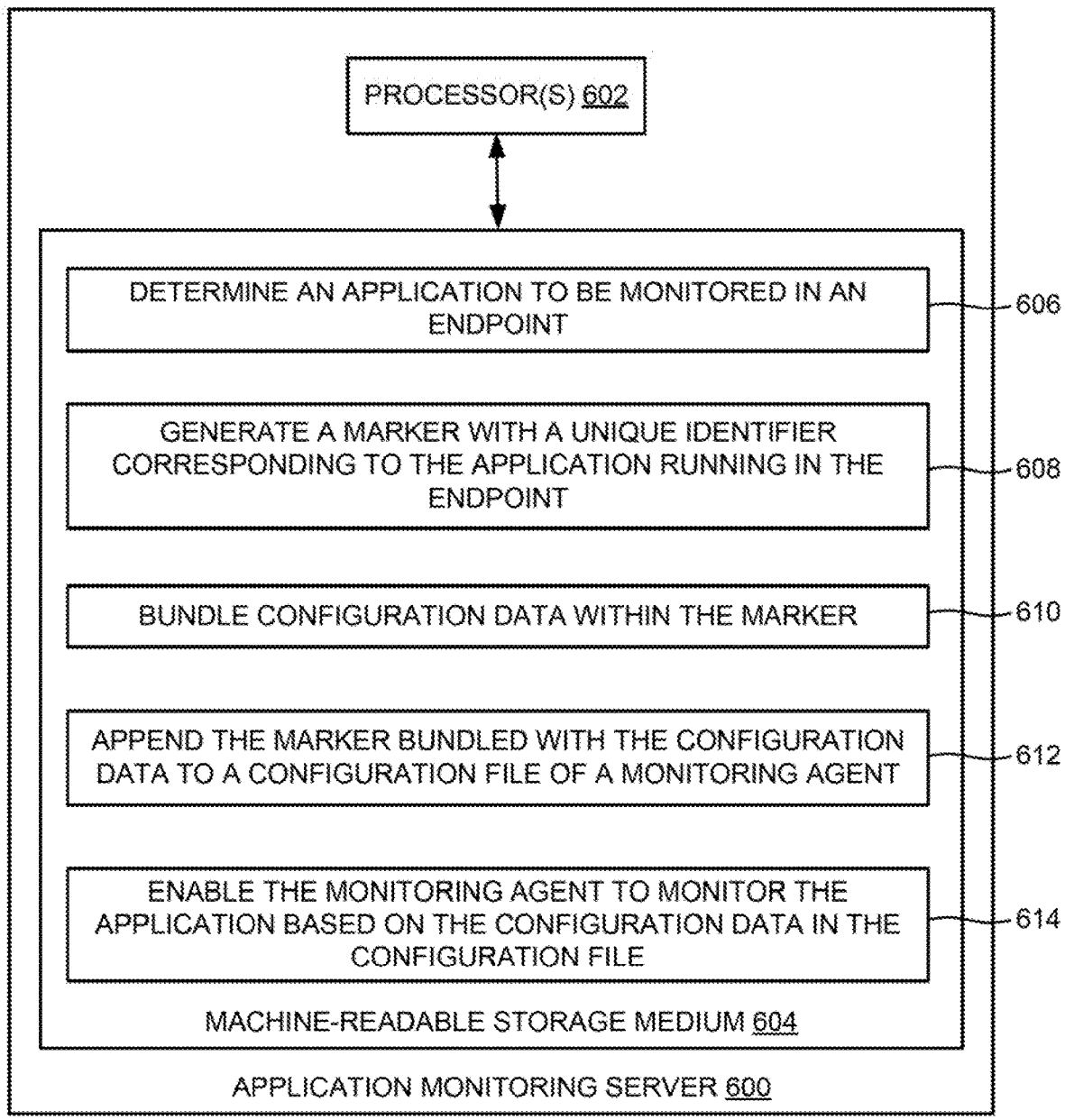
FIG. 6 is a block diagram of an example computing device including non-transitory computer-readable storage medium storing instructions to manage configuration data of a monitoring agent running in an endpoint using markers.

FIG. 6 is a block diagram of an example application monitoring server 600 including non-transitory computer-readable storage medium 604 storing instructions to manage configuration data of a monitoring agent running in an endpoint using markers. Application monitoring server 600 may include a processor 602 and machine-readable storage medium 604 communicatively coupled through a system bus. Processor 602 may be any type of central processing unit (CPU), microprocessor, or processing logic that interprets and executes machine-readable instructions stored in machine-readable storage medium 604. Machine-readable storage medium 604 may be a random-access memory (RAM) or another type of dynamic storage device that may store information and machine-readable instructions that may be executed by processor 602. For example, machine-readable storage medium 604 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 604 may be a non-transitory machine-readable medium. In an example, machine-readable storage medium 604 may be remote but accessible to application monitoring server 600.

Machine-readable storage medium 604 may store instructions 606-614. In an example, instructions 606-614 may be executed by processor 602 to enable the monitoring agent to monitor the application based on the configuration data bundled within the marker. Instructions 606 may be executed by processor 602 to determine an application to be monitored in an endpoint.

Instructions 608 may be executed by processor 602 to generate a marker with a unique identifier corresponding to the application running in the endpoint. Instructions 610 may be executed by processor 602 to bundle configuration data within the marker. The configuration data may specify a configuration for a monitoring agent installed on the endpoint to monitor the application.

Instructions 612 may be executed by processor 602 to append the marker bundled with the configuration data to a configuration file of the monitoring agent. Instructions 614 may be executed by processor 602 to enable the monitoring agent to monitor the application based on the configuration data in the configuration file.

Machine-readable storage medium 604 may further store instructions to be executed by processor 602 to disable monitoring of the application by deleting the configuration data within the marker. Machine-readable storage medium 604 may further store instructions to be executed by processor 602 to determine and update the configuration data of the application within the marker.

Thus, examples described herein may manage the lifecycle of the application content without any user intervention. The management of the content can be done in a monitoring agent agnostic way. Examples described herein may provide an update mechanism, in which application monitoring server 600 may not require any bookkeeping of the endpoint's content.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer implemented method comprising:
   determining an application to be monitored in an endpoint;
   generating a marker with a unique identifier corresponding to the application running in the endpoint;
   bundling configuration data within the marker by inserting the configuration data between a start marker and an end marker, wherein the configuration data is to specify a configuration for a monitoring agent installed on the endpoint to monitor the application;
   appending the marker bundled with the configuration data to a configuration file of the monitoring agent, wherein the marker is to distinguish the configuration data of the application from configuration data of other applications, that are being monitored by the monitoring agent, in the configuration file;
   enabling the monitoring agent to monitor the application based on the configuration data in the configuration file and the unique identifier; and
   disabling monitoring of the application comprising:
      determining the unique identifier for the application running in the endpoint; and
      disabling monitoring of the application by deleting the configuration data within the marker that is associated with the unique identifier.

2. A computer implemented method comprising:
   determining an application to be monitored in an endpoint;
   generating a marker with a unique identifier corresponding to the application running in the endpoint;
   bundling configuration data within the marker, wherein the configuration data is to specify a configuration for a monitoring agent installed on the endpoint to monitor the application;
   appending the marker bundled with the configuration data to a configuration file of the monitoring agent;
   enabling the monitoring agent to monitor the application based on the configuration data in the configuration file and the unique identifier; and
   disabling monitoring of the application, wherein disabling the monitoring of the application comprises:
      determining the unique identifier for the application running in the endpoint;
      recreating a reference marker using the unique identifier to identify the application;
      matching the reference marker with the marker stored in the configuration file; and
      deleting the configuration data within the marker that matches the reference marker to disable monitoring of the application.

3. A computer implemented method comprising:
- determining an application to be monitored in an endpoint;
- generating a marker with a unique identifier corresponding to the application running in the endpoint;
- bundling configuration data within the marker, wherein the configuration data is to specify a configuration for a monitoring agent installed on the endpoint to monitor the application;
- appending the marker bundled with the configuration data to a configuration file of the monitoring agent;
- enabling the monitoring agent to monitor the application based on the configuration data in the configuration file and the unique identifier;
- receiving a checksum of the configuration data of the application being monitored from the endpoint via a network;
- comparing the received checksum to a versioning file stored in an application monitoring server, wherein the versioning file comprises checksums of configuration data of multiple applications obtained from static content hosted in the application monitoring server, and wherein the checksums are dynamically updated upon performing updates to the static content on the application monitoring server;
- determining an update to the configuration data of the application in the endpoint based on the comparison;
- sending the update to the endpoint via the network; and
- updating the configuration data within the marker in response to a user selection of the update.

4. The computer implemented method of claim 1, further comprising:
- receiving input data associated with the application from a user; and
- generating the configuration data using the received input data.

5. The computer implemented method of claim 1, wherein the unique identifier comprises any combination of application name, port number, and service identifier associated with the application.

6. A computer implemented method comprising:
- determining an application to be monitored in an endpoint;
- generating a marker with a unique identifier corresponding to the application running in the endpoint;
- bundling configuration data within the marker, wherein the configuration data is to specify a configuration for a monitoring agent installed on the endpoint to monitor the application;
- appending the marker bundled with the configuration data to a configuration file of the monitoring agent, wherein appending the marker bundled with the configuration data to the configuration file comprises:
  - decrypting the configuration file of the monitoring agent running in the endpoint upon receiving a request to monitor the application, the configuration file comprising the configuration data of the monitoring agent to monitor the application;
  - appending the marker bundled with the configuration data to the decrypted configuration file; and
  - encrypting the configuration file including the marker bundled with the configuration data; and
- enabling the monitoring agent to monitor the application based on the configuration data in the configuration file and the unique identifier.

7. The computer implemented method of claim 1, wherein determining the application to be monitored comprises determining the application to be monitored in response to receiving a request to monitor the application.

8. The computer implemented method of claim 1, further comprising:
- encrypting at least a portion of the configuration file including the configuration data bundled within the marker upon executing the monitoring agent.

9. A system comprising:
- an endpoint having a monitoring agent to monitor applications running therein; and
- an application monitoring server communicatively connected to the endpoint via a network, wherein the application monitoring server comprises an agent monitoring unit to:
  - determine an application to be monitored, the application running in the endpoint;
  - generate a marker with a unique identifier corresponding to the application running in the endpoint;
  - bundle configuration data within the marker by inserting the configuration data between a start marker and an end marker, wherein the configuration data is to specify a configuration for the monitoring agent installed on the endpoint to monitor the application;
  - append the marker bundled with the configuration data to a configuration file of the monitoring agent, wherein the marker is to distinguish the configuration data of the application from configuration data of other applications, that are being monitored by the monitoring agent, in the configuration file;
  - instruct the monitoring agent to monitor the application according to the configuration data in the configuration file and the unique identifier; and
  - disable monitoring of the application by:
    - determining the unique identifier for the application running in the endpoint; and
    - disabling monitoring of the application by deleting the configuration data within the marker that is associated with the unique identifier.

10. A system comprising:
- an endpoint having a monitoring agent to monitor applications running therein; and
- an application monitoring server communicatively connected to the endpoint via a network, wherein the application monitoring server comprises an agent monitoring unit to:
  - determine an application to be monitored, the application running in the endpoint;
  - generate a marker with a unique identifier corresponding to the application running in the endpoint;
  - bundle configuration data within the marker, wherein the configuration data is to specify a configuration for the monitoring agent installed on the endpoint to monitor the application;
  - append the marker bundled with the configuration data to a configuration file of the monitoring agent;
  - instruct the monitoring agent to monitor the application according to the configuration data in the configuration file and the unique identifier; and
  - disable the monitoring of the application by:
    - determining the unique identifier for the application running in the endpoint;
    - recreating a reference marker using the unique identifier to identify the application;
    - matching the reference marker with the marker stored in the configuration file; and
    - deleting the configuration data within the marker that matches the reference marker.

11. A system comprising:
an endpoint having a monitoring agent to monitor applications running therein; and
an application monitoring server communicatively connected to the endpoint via a network, wherein the application monitoring server comprises an agent monitoring unit to:
   determine an application to be monitored, the application running in the endpoint;
   generate a marker with a unique identifier corresponding to the application running in the endpoint;
   bundle configuration data within the marker, wherein the configuration data is to specify a configuration for the monitoring agent installed on the endpoint to monitor the application;
   append the marker bundled with the configuration data to a configuration file of the monitoring agent;
   instruct the monitoring agent to monitor the application according to the configuration data in the configuration file and the unique identifier;
   receive a checksum of the configuration data of the application being monitored from the endpoint via a network;
   compare the received checksum to a versioning file stored in the application monitoring server, wherein the versioning file comprises checksums of configuration data of multiple applications obtained from static content hosted in the application monitoring server, and wherein the checksums are dynamically updated upon performing updates to the static content on the application monitoring server;
   determine an update to the configuration data of the application in the endpoint based on the comparison;
   send the update to the endpoint via the network; and
   update the configuration data within the marker in response to a user selection of the update.

12. The system of claim 9, wherein the agent monitoring unit is to:
   receive, via a user interface, input data associated with the application from a user; and
   generate the configuration data using the received input data.

13. The system of claim 9, wherein the unique identifier comprises any combination of application name, port number, and service identifier associated with the application.

14. A system comprising:
an endpoint having a monitoring agent to monitor applications running therein; and
an application monitoring server communicatively connected to the endpoint via a network, wherein the application monitoring server comprises an agent monitoring unit to:
   determine an application to be monitored, the application running in the endpoint;
   generate a marker with a unique identifier corresponding to the application running in the endpoint;
   bundle configuration data within the marker, wherein the configuration data is to specify a configuration for the monitoring agent installed on the endpoint to monitor the application;
   append the marker bundled with the configuration data to a configuration file of the monitoring agent by:
      decrypting the configuration file of the monitoring agent running in the endpoint upon receiving a request to monitor the application, the configuration file comprising the configuration data of the monitoring agent to monitor the application;
      bundling the configuration data corresponding to the application within the marker;
      appending the marker bundled with the configuration data to the decrypted configuration file; and
      encrypting the configuration file including the marker bundled with the configuration data; and
   instruct the monitoring agent to monitor the application according to the configuration data in the configuration file and the unique identifier.

15. A non-transitory machine-readable storage medium encoded with instructions that, when executed by a computer, cause the computer to:
   determine an application to be monitored in an endpoint;
   generate a marker with a unique identifier corresponding to the application running in the endpoint;
   bundle configuration data within the marker by inserting the configuration data between a start marker and an end marker, wherein the configuration data is to specify a configuration for a monitoring agent installed on the endpoint to monitor the application;
   append the marker bundled with the configuration data to a configuration file of the monitoring agent, wherein the marker is to distinguish the configuration data of the application from configuration data of other applications, that are being monitored by the monitoring agent, in the configuration file;
   enable the monitoring agent to monitor the application based on the configuration data in the configuration file and the unique identifier; and
   disable monitoring of the application by:
      determining the unique identifier for the application running in the endpoint; and
      disabling monitoring of the application by deleting the configuration data within the marker that is associated with the unique identifier.

16. A non-transitory machine-readable storage medium encoded with instructions that, when executed by a computer, cause the computer to:
   determine an application to be monitored in an endpoint;
   generate a marker with a unique identifier corresponding to the application running in the endpoint;
   bundle configuration data within the marker, wherein the configuration data is to specify a configuration for a monitoring agent installed on the endpoint to monitor the application;
   append the marker bundled with the configuration data to a configuration file of the monitoring agent;
   enable the monitoring agent to monitor the application based on the configuration data in the configuration file and the unique identifier; and
   disable monitoring of the application, wherein instructions to disable monitoring of the application comprise instructions to:
      determine the unique identifier for the application running in the endpoint;
      recreate a reference marker using the unique identifier to identify the application;
      match the reference marker with the marker stored in the configuration file; and
      delete the configuration data within the marker that matches the reference marker to disable monitoring of the application.

17. A non-transitory machine-readable storage medium encoded with instructions that, when executed by a computer, cause the computer to:

determine an application to be monitored in an endpoint;
generate a marker with a unique identifier corresponding to the application running in the endpoint;
bundle configuration data within the marker, wherein the configuration data is to specify a configuration for a monitoring agent installed on the endpoint to monitor the application;
append the marker bundled with the configuration data to a configuration file of the monitoring agent;
enable the monitoring agent to monitor the application based on the configuration data in the configuration file and the unique identifier;
receive a checksum of the configuration data of the application being monitored from the endpoint via a network;
compare the received checksum to a versioning file stored in the computer, wherein the versioning file comprises checksums of configuration data of multiple applications obtained from static content hosted in the computer, and wherein the checksums are dynamically updated upon performing updates to the static content on the computer;
determine an update to the configuration data of the application in the endpoint based on the comparison;
send the update to the endpoint via the network; and
update the configuration data within the marker in response to a user selection of the update.

18. The non-transitory machine-readable storage medium of claim 15, wherein the unique identifier comprises any combination of application name, port number, and service identifier associated with the application.

* * * * *